United States Patent

Wallner et al.

[11] Patent Number: 5,087,071
[45] Date of Patent: Feb. 11, 1992

[54] VEHICLE AIR BAG STRUCTURE AND METHOD OF FORMING

[75] Inventors: John P. Wallner, Romeo; Ken B. Taggart, St. Clair Shores, both of Mich.

[73] Assignee: TRW Vehicle Safety Systems Inc., Lyndhurst, Ohio

[21] Appl. No.: 561,039

[22] Filed: Aug. 1, 1990

[51] Int. Cl.⁵ .............................................. B60R 21/20
[52] U.S. Cl. ...................................... 280/743; 280/732
[58] Field of Search .............. 280/728, 729, 731, 732, 280/743, 738, 739

[56] References Cited

U.S. PATENT DOCUMENTS

| | | | |
|---|---|---|---|
| 3,243,822 | 4/1966 | Lipkin | 280/743 |
| 3,476,402 | 11/1969 | Wilfert | 280/743 |
| 3,503,588 | 3/1970 | Bach | 74/89.15 |
| 3,591,201 | 7/1971 | Brawn et al. | 280/743 |
| 3,761,111 | 9/1973 | Kemper | 280/743 |
| 3,810,654 | 5/1974 | DeBane, Jr. et al. | 280/743 |
| 3,874,696 | 4/1975 | Gardner | 280/475 |
| 4,003,588 | 1/1977 | Oka et al. | 280/743 |
| 4,006,918 | 2/1977 | MacFarland | 280/743 |
| 4,010,055 | 3/1977 | Oka et al. | 280/743 |
| 4,097,840 | 6/1978 | Chappelle | 280/431 |
| 4,153,273 | 5/1979 | Risko | 280/743 |
| 4,169,613 | 10/1979 | Barnett | 280/743 |
| 4,181,325 | 1/1980 | Barnett | 280/743 |
| 4,187,927 | 2/1980 | Byrne | 182/2 |
| 4,213,634 | 7/1980 | Hoshino et al. | 280/743 |
| 4,345,779 | 8/1982 | Busby | 280/766.1 |
| 4,351,544 | 9/1982 | Ross | 280/743 |
| 4,400,986 | 8/1983 | Swanson et al. | 74/149 |
| 4,402,526 | 9/1983 | Huetsch | 280/766.1 |
| 4,466,637 | 8/1984 | Nelson | 280/766.1 |
| 4,714,140 | 12/1987 | Hatton et al. | 280/442 |
| 4,830,401 | 5/1989 | Honda | 280/743 |
| 4,842,300 | 6/1989 | Ziomek et al. | 280/743 |
| 4,883,576 | 11/1989 | Gemma | 280/765.1 |
| 4,944,529 | 7/1990 | Backhaus | |

FOREIGN PATENT DOCUMENTS

2503447 8/1975 Fed. Rep. of Germany ...... 280/732
2135258 8/1984 United Kingdom ............. 280/763.1

Primary Examiner—Kenneth R. Rice
Attorney, Agent, or Firm—Calfee, Halter & Griswold

[57] ABSTRACT

A vehicle air bag includes a length of fabric. The length of fabric is folded at predetermined locations to form a central portion and two end portions. When folded, the end portions partially overlap the central portion. One end portion partially overlaps the other end portion. The edges of the end portions are aligned with the edges of the central portions. The partially overlapping end portions and aligned edges of the central and end portions are joined together to form an inflatable air bag adapted to form a predetermined configuration inflated with gas.

23 Claims, 6 Drawing Sheets

VEHICLE AIR BAG STRUCTURE AND METHOD OF FORMING

TECHNICAL FIELD

The present invention relates to a new vehicle air bag structure and to a method of forming the air bag structure. The air bag structure has a relatively simple design, and the method of forming the air bag provides a relatively simple and efficient way of making the air bag, especially by mass production techniques.

BACKGROUND

A typical vehicle air bag system comprises an inflator or gas generator, an air bag, and a container enclosing the inflator and the air bag. The air bag, while in the container, is folded into a predetermined configuration. Upon actuation of the inflator, gas at relatively high pressure is directed into the air bag. The bag is deployed through a portion of the container and is inflated to a predetermined configuration. In that predetermined configuration, the air bag is designed to restrain a vehicle occupant against impacting a portion of the vehicle.

Because space requirements are increasingly important in vehicle design, it is important that an air bag be capable of being folded into a relatively compact package size, so that it can be disposed in a container of relatively small size. Also, as the number of air bags being installed in vehicles increases, it becomes increasingly important to provide efficient and effective ways of mass producing air bags.

A known structure for a vehicle air bag comprises several pieces of fabric cut into different shapes (e.g., rectangular, circular, etc.), and fastened together, preferably sewn together, to form the air bag. An opening formed in one of the pieces of fabric functions as a gas inlet opening for the air bag. Often, some additional fabric is attached to the air bag in proximity to the gas inlet opening. The additional fabric is useful in supporting retaining means, such as rigid metal bars, which enables the air bag to be securely attached to a portion of the container.

Forming an air bag by securing together pieces of fabric has certain drawbacks. Substantial manufacturing time is required to cut the fabric into different configurations, to orient the pieces of fabric properly relative to each other, and to sew the pieces of fabric to each other while in the proper orientation. Also, because the fabric is cut into different geometric shapes, which are not all rectangular, certain amounts of fabric are lost as the non-rectangular pieces are cut. Such drawbacks are particularly significant considerations in respect to mass production of air bags.

In the patent literature, there have been some suggestions for air bag structures in which the air bag is formed by a single piece of material, which forms a three-dimensional configuration when the air bag is inflated. For example, U.S. Pat. No. 4,010,055, discloses a single piece of fabric material formed into an open tube. The tube is flattened to a rectangular shape and then sealed along its open ends. An opening is formed in the flattened tube to serve as a gas inlet opening. To complete the air bag, the flattened tube is folded and sewn to form additional seams to obtain the desired predetermined air bag configuration.

U.S. Pat. No. 4,006,918 discloses a dual chambered air bag formed from a single piece of fabric material. The air bag has an opening for receiving an inflator. To form the air bag, the material is first folded upon itself and stitched along portions of the open sides and ends. The bag is then folded again, turned inside-out, and sewn along open sides to form an inner chamber and an outer chamber. The inflator is inserted through the opening and positioned so that it is in fluid communication with each of the inner and outer chambers.

U.S. Pat. No. 3,910,654 also discloses an air bag having a predetermined three-dimensional configuration formed from a single piece of fabric material. To form the air bag, the material is first folded upon itself and stitched along its open sides. Material surrounding an open end is again folded and stitched to form a double layer of material surrounding the open end. The bag is then turned inside-out, folded, and stitched to form the three-dimensional configuration.

The air bag disclosed in each of the foregoing patents has a relatively complex three-dimensional configuration having side walls intermediate two layers of material, and requiring numerous folds and sewn seams to manufacture the air bag. The air bag disclosed in each of U.S. Pat. Nos. 4,006,918 and 3,810,654 also require the air bag to be turned inside-out between folding and sewing steps.

Applicants believe there is a continuing need to simplify the structure and techniques for forming air bags, especially in view of the need to produce the air bags by mass assembly techniques.

SUMMARY OF THE PRESENT INVENTION

The present invention relates to a new and useful vehicle air bag structure and technique for forming the air bag structure. An air bag formed according to the invention is formed from a single length of fabric. It has a configuration which readily lends itself to being formed by automated, mass production techniques. Moreover, the air bag is designed to be simple to manufacture and to minimize the amount of fabric required to form the air bag.

An air bag according to the present invention comprises a single length of fabric folded at two locations to form a central portion and a pair of end portions partially overlapping the central portion and each other. The edges of the end portions are aligned with respective edges of the central portion. To complete the air bag, the overlapping end portions are first sewn together along a first seam. The aligned edges of the central and end portions are then sewn together, forming two additional seams. The two seams are parallel to each other and extend transversely of the first seam, so that the three seams form a generally H-shaped pattern. The air bag thus defines an enclosure which can be inflated to a predetermined configuration.

The length of fabric has an opening which forms the gas inlet opening for the air bag. Preferably, the opening is formed so as to be located in one of the end portions when the fabric is folded. The border of the opening is adapted to be secured to a portion of an air bag container in order to secure the air bag to the container. Moreover, it is contemplated that additional fabric can be attached to the perimeter of the opening, so as to form a tubular chute extending away from the opening. The tubular chute effectively extends the opening in the air bag. Also, the tubular chute is adapted to be secured to an air bag container for enabling the air bag to be attached to the container. The tubular chute spaces the air bag from the air bag container during inflation, and thereby avoids interference between the air bag, air bag container and the vehicle.

Preferably, the length of fabric is rectangular, and the air bag is inflatable to a generally pillow shaped profile. By providing a rectangular length of fabric, the fabric can be produced from webs of fabric which are cut to appropriate lengths with little, if any, material wasted. Moreover, cutting rectangular lengths of fabric from webs is an efficient way of producing the lengths of fabric, by automated, mass production techniques.

Also, the length of fabric is folded about fold lines which extend transverse to the aligned edges of the central and end portions. Using a rectangular length of fabric, the bag structure lends itself to being simply and efficiently folded, by automated, mass production techniques.

Moreover, the seam pattern used to secure the end portions and edges together is relatively simple, and is designed to be formed using stitching passes that are either parallel to each other or transverse to each other. Thus, the seam pattern also lends itself to forming the bag structure by automated, mass production techniques.

Other features and advantages of the present invention will become further apparent from the following detailed description and the accompanying drawings.

DETAILED DESCRIPTION OF THE PREFERRED EMBODIMENT

Figure 1:
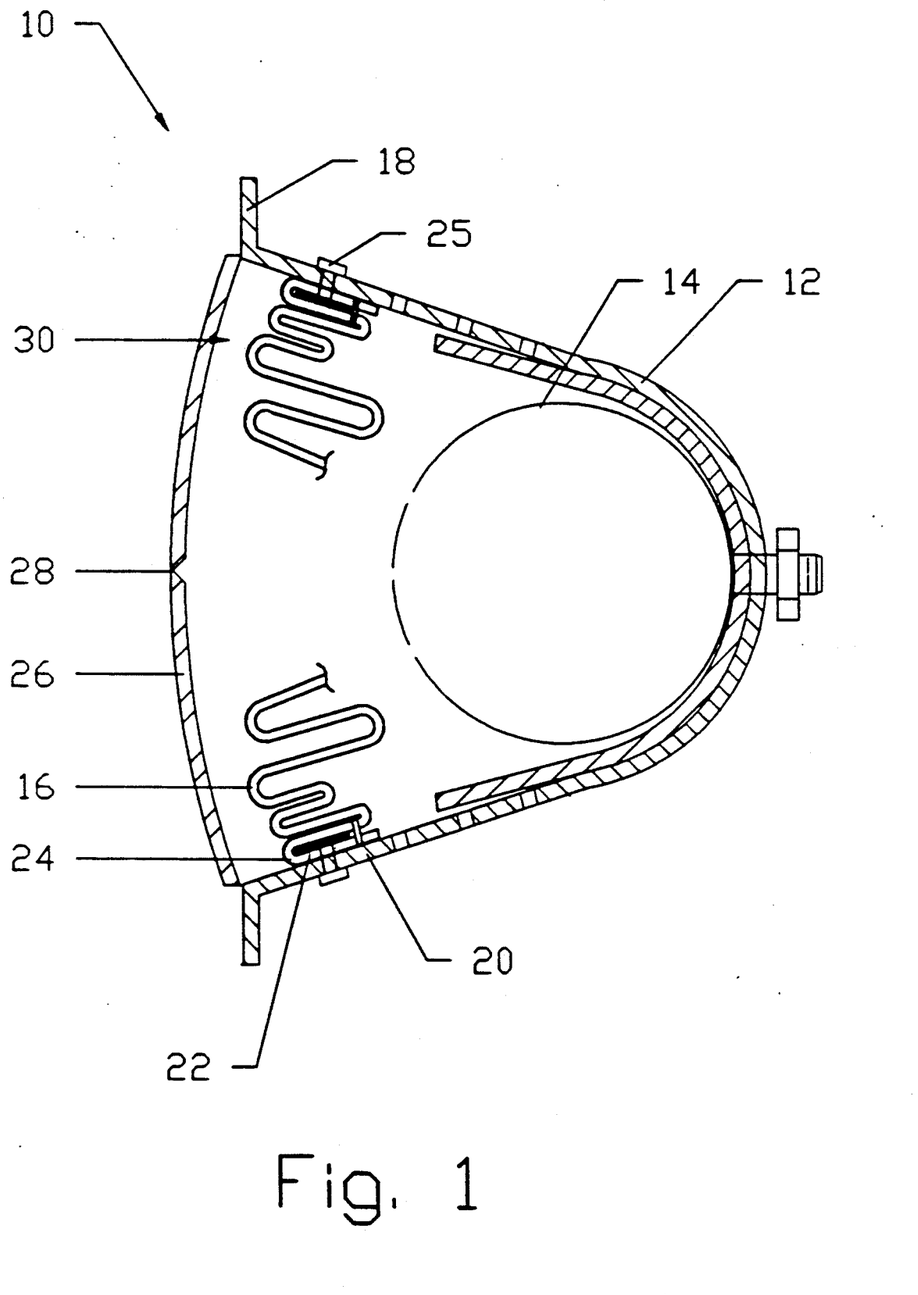
FIG. 1 is a schematic cross-section of an air bag module incorporating an air bag formed according to the principles of the invention, with certain portion omitted.

FIG. 1 shows an air bag module 10 designed for incorporation into a vehicle. The module 10 comprises a container or reaction can 12, an inflator 14 and a folded air bag 16 disposed in the container 12. The container 12 can have any known construction for use in an air bag system. The inflator 14 can comprise any known construction for use in an air bag system. The air bag 16 is constructed according to the principles of the present invention.

Figure 2:
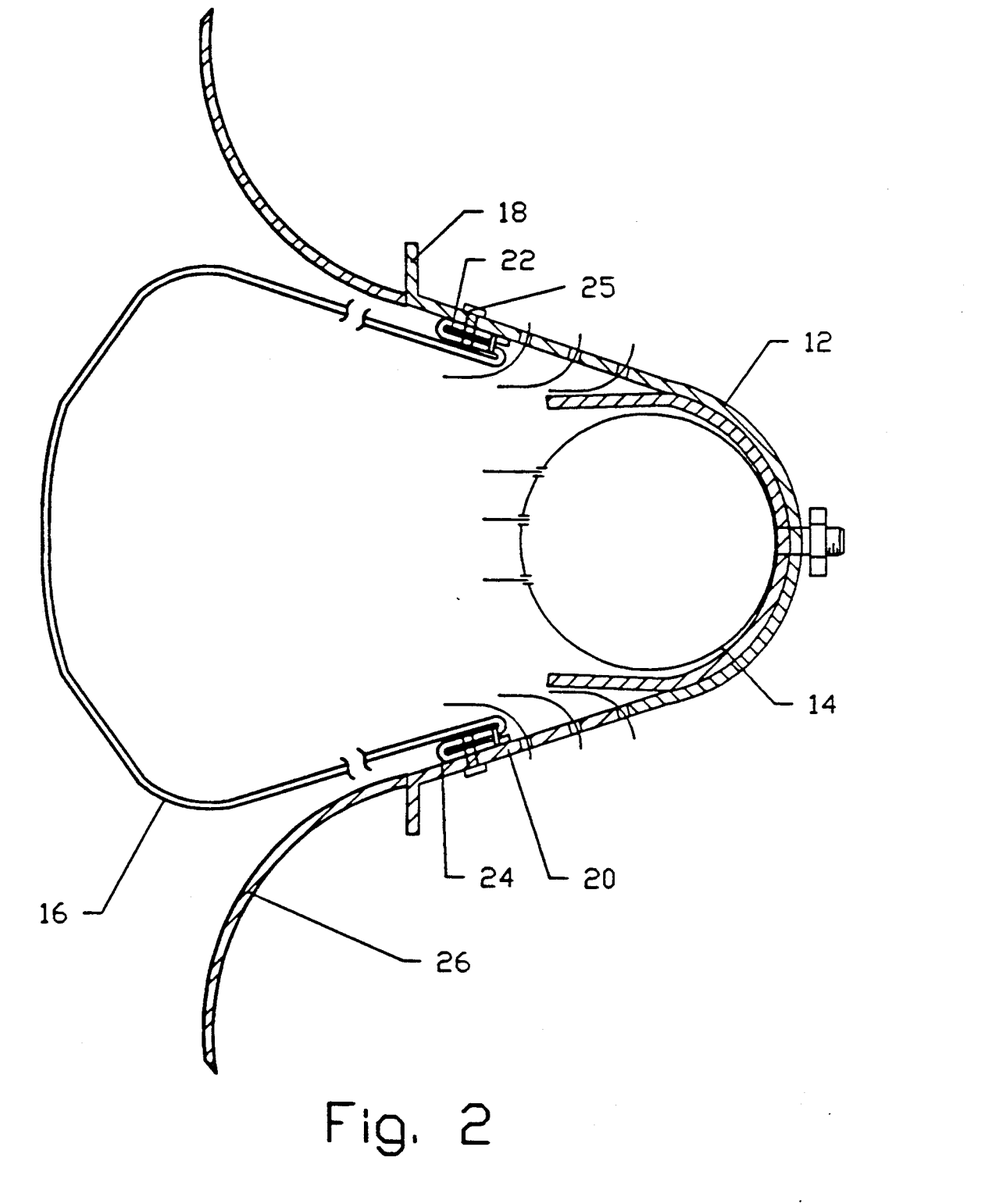
FIG. 2 is a schematic illustration of the air bag module of FIG. 1, as the bag is deployed.

As illustrated in FIGS. 1 and 2, the reaction can 12 is secured to a structural portion of a vehicle at flanges 18, in order to attach the module 10 to the vehicle. The air bag 16 is stored in the reaction can 12 in a folded condition. The air bag 16 can be prefolded, and then attached to the reaction can 12. Alternatively, the air bag 16 can be first attached to the reaction can 12, and then folded into the reaction can. Both techniques are known in the art. With either technique, one or more metal retainer members 22 can be disposed in fabric tubes 24 formed in the air bag 16 to enable the air bag 16 to be secured to the reaction can 12. The air bag is secured to the mouth of the reaction can 12 by bolts 25 or other conventional fasteners, which extend through openings in the fabric tubes 24 and retainer members 22.

After the folded air bag 16 and the inflator 14 are disposed in the reaction can 12, a cover 26 is secured over the mouth 20 of the reaction can to complete the module 10. The cover 26 can be secured to the reaction can 12 by a variety of means which are well known in the art.

During deployment of the air bag 16, the air bag remains attached to the mouth 20 of the reaction can 12 (see FIG. 2). The reaction can 12 transmits reaction forces to the vehicle frame, to stabilize the module during deployment of the air bag 16. The cover 26 has score lines 28 at appropriate locations to weaken the cover and to enable the cover 26 readily to separate into sections as the air bag is being deployed (see FIG. 2).

As illustrated in FIGS. 1 and 2, the air bag 16 includes a gas inlet opening 30. The inlet opening 30 allows gas under pressure to be directed into the air bag 16 to inflate the air bag 16. The fabric tubes 24 which contain the retainer members 22 are formed at the perimeter of the gas inlet opening 30. Thus, the portions of the air bag 16 adjacent the gas inlet opening are attached to the reaction can 12.

Figure 3:
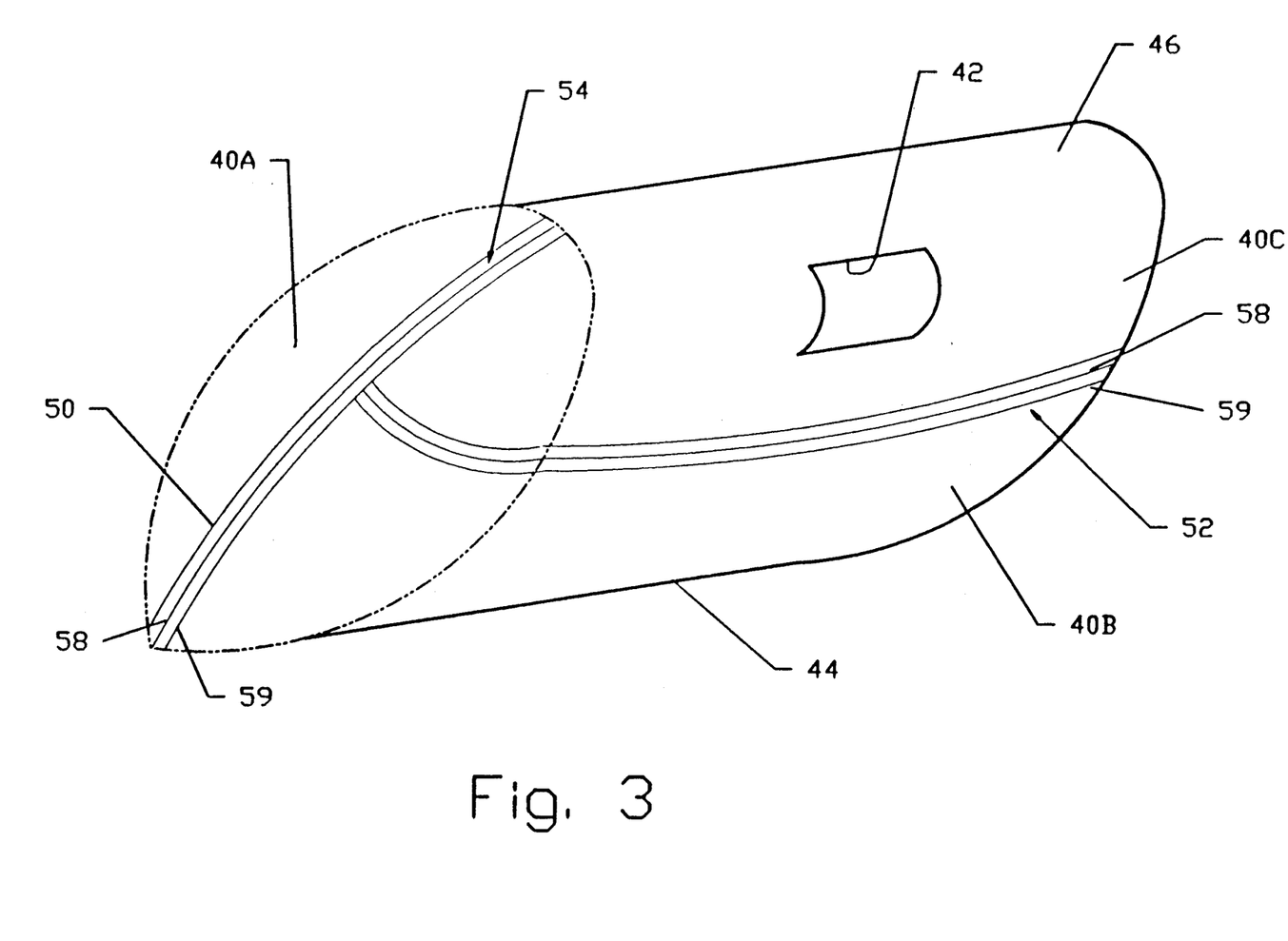
FIG. 3 is a three-dimensional view of an inflated air bag formed according to the principles of the invention.

The air bag 16 is formed by the technique set forth in detail below. The air bag 16 is designed to have a pillow shaped configuration when fully inflated, as illustrated schematically in FIG. 3. The air bag 16 is preferably formed of woven nylon material. However, it is contemplated that other materials, both woven and non-woven, can also be used to form the air bag 16.

The air bag 16 is formed in the manner schematically illustrated in FIGS. 4-9. Initially, a length of the woven nylon fabric 40 is provided, preferably in a rectangular configuration (see FIG. 4). The length of fabric 40 has a rectangular opening 42 near one end thereof. It should be understood that the terms "rectangular configuration" and "rectangular opening" may include elongate configurations with, for example, rounded corners or non-parallel sides.

Each end of the length of fabric 40 is folded along a respective fold line 44, 46. The fold lines 44, 46 divide the length of fabric 40 into a central portion 40A and a pair of end portions 40B, 40C (see FIG. 5). Each end portion 40B, 40C partially overlaps the central portion 40A. Also, the end portion 40B partially overlaps the end portion 40C, the partially overlapping end portions being immediately adjacent to each other. The end portions are partially overlapped with the central portion 40A in such a manner that edges 48 of the central portion are substantially aligned with edges 50 of the overlapping end portions (see FIGS. 8, 9).

After the length of fabric 40 is folded, the partially overlapping end portions 40B, 40C are sewn together along a seam 52. The seam 52 extends transverse to the edges 48, 50 of the central and end portions. The seam 52 is formed by a double needle stitch having double stitch lines 58, 59. The double needle stitch is performed in a single pass of a double needle stitching device of known construction. The double stitch lines 58, 59 are preferably 3 millimeters (mm) apart.

Figure 6:
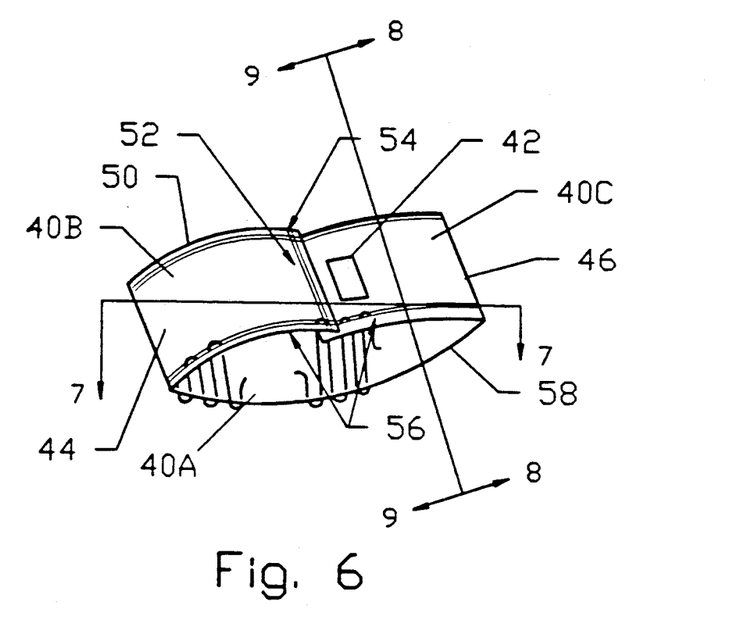
FIG. 6 schematically illustrates the seam patterns used to form the fabric into an air bag.

Next, the aligned edges 48, 50 of the partially overlapping central and end portions are sewn together along seams 54, 56. When the length of fabric is rectangular, as shown in FIG. 6, the seams 54, 56 are parallel to each other. Each seam 54, 56 is formed by a double needle stitch also having double stitch lines 58, 59, and is also made in a single pass of a double needle stitching device. Also, each of the double stitch lines 58, 59 forming the seams 54, 56 are disposed 3 mm apart. Thus, the seams 52, 54, 56 can each be made by the same device. Alternatively, a single stitching device can form the seams 52, 54, 56 by appropriately orienting the stitching device to form each seam. Plural stitching devices can also be used to form the seams, each device being oriented to stitch one or more of the seams 52, 54, 56.

Figure 4:
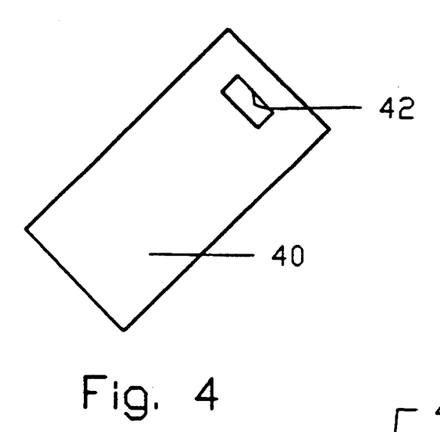
FIG. 4 is a schematic illustration of a length of fabric used to form an air bag according to the invention.
Figure 5:
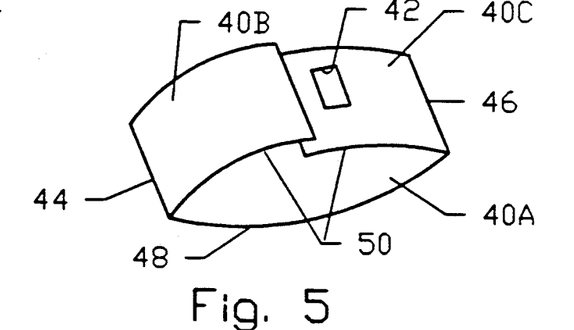
FIG. 5 schematically illustrates the length of fabric in a folded condition.
Figure 5A:
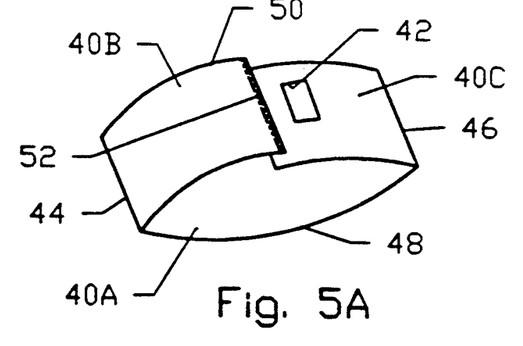
FIG. 5A schematically illustrates the length of fabric in a folded condition with overlapping end portions sewn together along a first seam.

As seen in FIGS. 4–6, the rectangular opening 42 forms the gas inlet opening 30 for the air bag. The opening 42 is preferably formed in the part of the fabric 40 forming the end portion 40C. Fabric at the rectangular opening 42 can be used to form fabric tubes 24 at the perimeter of the gas inlet opening 30. The fabric tubes 24 are dimensioned to receive the retainer members 22 which enable the air bag 16 to be securely attached to the reaction can 12.

Figure 6A:
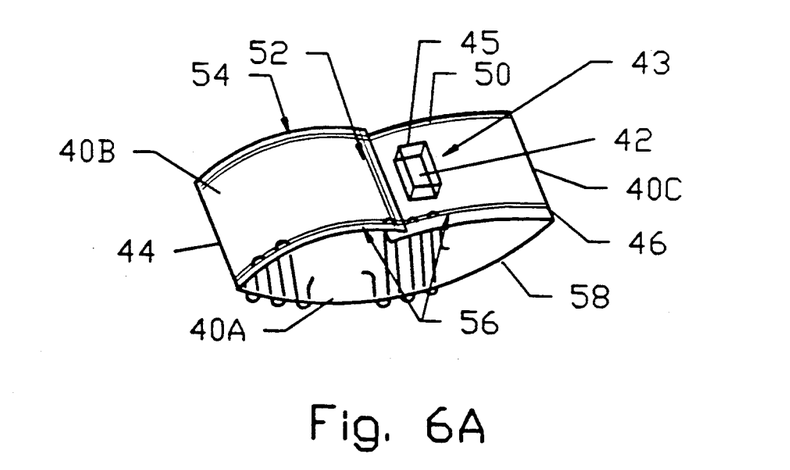
FIG. 6A schematically illustrates the air bag of FIG. 6 with a tubular chute about the opening in the length of fabric.
Figure 7:
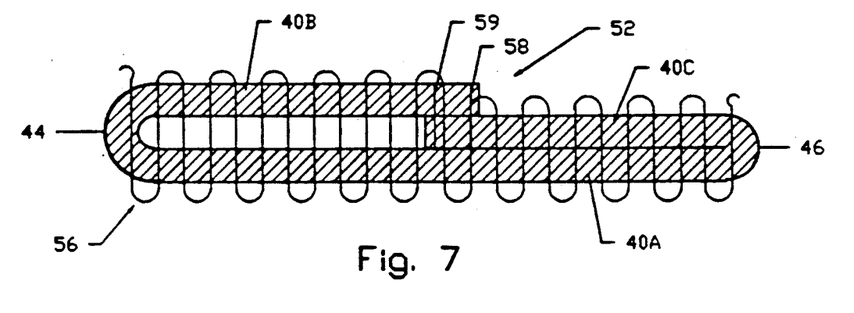
FIGS. 7-9 are cross-sectional views of the air bag structure of FIG. 6, taken from the directions 7—7, 8—8 and 9—9, respectively.
Figure 8:
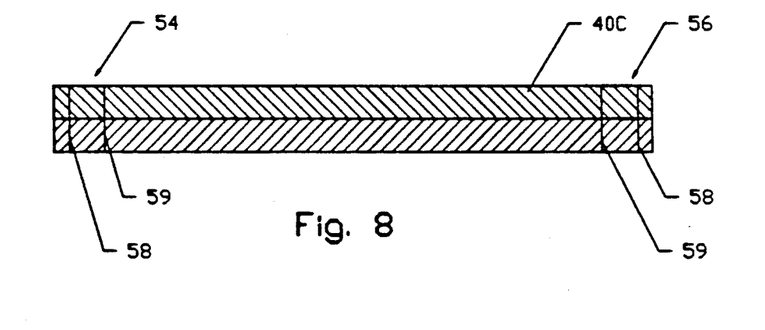
Figure 9:
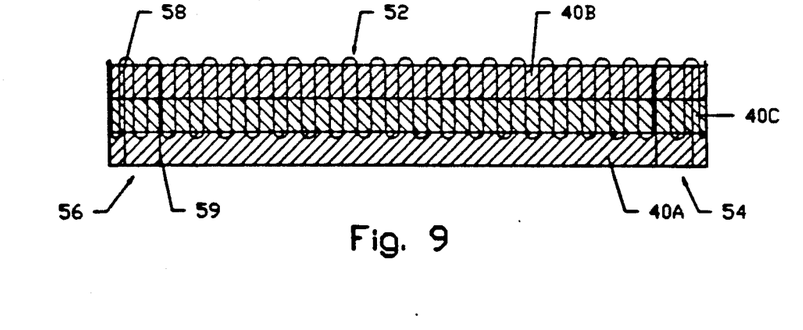

As shown in FIG. 6A, an alternate embodiment of the air bag structure includes additional fabric attached at the perimeter of the rectangular opening 42 to form a tubular chute 43. The chute 43 extends outwardly from the opening 42 and end portion 40C to space the air bag from the reaction can. Such spacing helps avoid interference between the air bag, reaction can, and vehicle during inflation.

In the embodiment of FIG. 6A, a mouth 45 of the tubular chute 43 forms the gas inlet opening 30 of the air bag 16. Fabric tubes may likewise be formed at the perimeter of the mouth 45 of the chute, dimensioned to receive retainer members and to enable attachment of the air bag 16 to the reaction can 12.

The foregoing air bag structure and method for forming the air bag structure, are believed to be relatively simple, and to make efficient use of the length of fabric 40. Additionally, the method for forming the air bag structure is particularly suited to forming the air bag by automated, mass production methods. Because the air bag is formed from a rectangular length of fabric, numerous lengths of fabric can be efficiently formed from webs of the fabric, with little, if any, loss of material. The length of fabric can be efficiently folded and stitched to form the air bag in the manner disclosed above, by relatively simple folding structure, and by stitching devices designed to stitch few, and relatively simple, seam patterns.

With the foregoing disclosure in mind, it is believed that various modifications of the preferred structure and technique will become apparent to those of ordinary skill in the art.

We claim:

1. A method of forming an air bag, comprising the steps of:
   (a) providing a length of fabric;
   (b) folding the length of fabric at predetermined locations to form a central portion intermediate and immediately adjacent to two end portions with each end portion at least partially overlapping the central portion, one end portion at least partially overlapping and immediately adjacent to the other end portion, and edges of the end portions disposed generally in alignment with corresponding edges of the central portion;
   (c) fastening the partially overlapping end portions to each other without reforming the folded configuration of the length of fabric; and
   (d) fastening the aligned edges of the central portion and the partially overlapping end portions to each other without reforming the folded configuration of the length of fabric to form an inflatable air bag, the inflatable air bag being adapted to have a predetermined configuration when inflated with gas.

2. A method as set forth in claim 1 including the further step of forming an opening in the length of fabric at a location such that said opening will be disposed at a predetermined location on the inflatable air bag, the opening adapted to form a gas inlet opening for the inflatable air bag.

3. A method as set forth in claim 2, wherein said step of forming an opening in the length of fabric comprises forming the opening in the length of fabric such that the opening is disposed in one of said end portions of the length of fabric when the length of fabric is folded at the predetermined locations.

4. A method as set forth in claim 2, wherein said step of providing a length of fabric comprises providing a substantially rectangular length of fabric, and wherein said step of folding the length of fabric at the predetermined locations comprises the step of folding the fabric to form folds disposed transverse to the aligned edges of the central and end portions.

5. A method as set forth in any of claims 1–4 wherein said step of fastening the partially overlapping end portions to each other comprises forming a first seam by sewing the partially overlapping end portions to each other, and wherein said step of fastening the aligned edges of the central portion and the partially overlapping end portions to each other comprises forming parallel second and third seams by sewing the aligned edges of the partially overlapping central portion and end portions to each other, the first seam being oriented transverse to the parallel second and third seams.

6. A method as set forth in claim 5, wherein the step of forming each of the first, second and third seams, respectively, comprises the step of forming a double stitch in respective overlapping portions of the length of fabric.

7. A method as set forth in claim 6 including the further step of securing an additional section of fabric to the length of fabric to form a tube surrounding and extending away from the opening in the length of fabric, the tube forming a chute which effectively extends the gas inlet opening for the inflatable air bag.

8. A method of forming an air bag system comprising the steps of:
   (a) providing a length of fabric;
   (b) folding the length of fabric at predetermined locations to form a central portion intermediate and immediately adjacent to two end portions with each end portion at least partially overlapping and immediately adjacent to the other end portion, and edges of the end portions disposed generally in alignment with corresponding edges of the central portion;
   (c) fastening the partially overlapping end portions to each other without reforming the folded configuration of the length of fabric;

(d) fastening the aligned edge of the central portion and the partially overlapping end portions to each other without reforming the folded configuration of the length of fabric to form an inflatable air bag, the inflatable air bag being adapted to have a predetermined configuration when inflated with gas; and (e) locating the inflatable air bag in an air bag container, and securing the inflatable air bag to the air bag container.

9. A method as set forth in claim 8, including the further step of folding the inflatable air bag into a predetermined configuration.

10. A method as set forth in claim 9, including forming an opening in the length of fabric at a location such that said opening will be disposed at a predetermined location on the inflatable air bag, the opening defining a gas inlet opening for the inflatable air bag.

11. A method as set forth in claim 10, wherein said step of forming an opening in the length of fabric comprises forming the opening in the length of fabric such that the opening is disposed in one of said end portions of the length of fabric when the length of fabric is folded at the predetermined locations.

12. A method as set forth in claim 10, wherein said step of providing a length of fabric comprises providing a substantially rectangular length of fabric, and wherein said step of folding the length of fabric at the predetermined locations comprises the step of folding the fabric to form folds disposed transverse to the aligned edges of the central and end portions.

13. A method as set forth in any of claims 8–12, wherein said step of fastening the partially overlapping end portions to each other comprises forming a first seam by sewing the partially overlapping end portions to each other, and wherein said step of fastening the aligned edges of the central portion and the partially overlapping end portions to each other comprises forming parallel second and third seams by sewing the aligned edges of the partially overlapping central portion and end portions to each other, the first seam being oriented transverse to the parallel second and third seams.

14. A vehicle air bag structure comprising a length of fabric folded at two spaced apart locations to form a central portion intermediate and adjacent to a pair of end portions, each end portion at least partially overlapping the central portion and one end portion at least partially overlapping and immediately adjacent to the other end portion, the end portions having edges generally aligned with corresponding edges of the central portion, said partially overlapping end portions being sewn to each other to form a first seam and the aligned edges of the central portion and the overlapping end portions being sewn to each other along second and third seams to complete an inflatable bag structure adapted to form a predetermined configuration when the air bag is inflated with gas, said first seam being oriented transverse to said second and third seams.

15. A vehicle air bag structure as set forth in claim 14, further including an opening in said length of fabric at a location such that said opening will be disposed at a predetermined location on said inflatable air bag.

16. A vehicle air bag structure as set forth in claim 15, wherein said opening is disposed in one of said end portions of said length of fabric when said length of fabric is folded at the spaced apart locations.

17. A vehicle air bag structure as set forth in claim 14, wherein said partially overlapping end portions are sewn to each other, and said edges of the end portions are sewn to the aligned, overlapping edges of the central portion.

18. A vehicle air bag structure as set forth in claim 15, wherein said length of fabric comprises a substantially rectangular length of fabric, and wherein said length of fabric is folded to form folds disposed transverse to the aligned edges of said central and end portions.

19. A vehicle air bag structure as set forth in any of claims 14–18, wherein said aligned edges of said central portion and said partially overlapping end portions are sewn to each other along parallel second and third seams, said first seam being oriented transverse to said parallel second and third seams.

20. A vehicle air bag structure as set forth in claim 19, wherein each of the first, second and third seams, respectively, comprises a double stitch in the respective overlapping portions of said length of fabric.

21. A vehicle air bag structure as set forth in claim 20, wherein an additional section of fabric is secured to said length of fabric to form a tube surrounding and extending away from the opening in the length of fabric, said tube forming a chute which effectively extends the gas inlet opening for the inflatable air bag.

22. A vehicle air bag system comprising:

(a) a vehicle air bag structure comprising a length of fabric folded at two spaced apart locations to form a central portion intermediate and adjacent to a pair of end portions, each end portion at least partially overlapping the central portion and one end portion at least partially overlapping and immediately adjacent to the other end portion, the end portions having edges generally aligned with corresponding edges of the central portion, said partially overlapping end portions being sewn to each other to form a first seam and the aligned edges of the central portion and the overlapping end portions being sewn to each other along generally parallel second and third seams to complete an inflatable bag structure adapted to form a predetermined configuration when the air bag is inflated with gas, said first seam being oriented transverse to said generally parallel second and third seams; and (b) an air bag container, said air bag being disposed in and secured to said container.

23. A vehicle air bag system as defined in claim 22, wherein said air bag is disposed in said container in a folded condition.

* * * * *